(12) United States Patent
Izawa

(10) Patent No.: US 6,408,116 B1
(45) Date of Patent: Jun. 18, 2002

(54) LIGHT GUIDE PATH ELEMENT AND OPTICAL PICKUP

(75) Inventor: Masataka Izawa, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/503,175

(22) Filed: Feb. 14, 2000

(30) Foreign Application Priority Data

Feb. 12, 1999 (JP) ............................................. 11-034809

(51) Int. Cl.[7] .................................................. G02B 6/34
(52) U.S. Cl. ........................................ 385/37; 359/569
(58) Field of Search .......................... 385/37, 129–131; 359/569; 369/109, 286

(56) References Cited

U.S. PATENT DOCUMENTS

| | | | | |
|---|---|---|---|---|
| 4,672,187 A | * | 6/1987 | Fujita et al. | 250/201.5 |
| 4,833,561 A | * | 5/1989 | Sunagawa et al. | 360/114.06 |
| 4,868,803 A | * | 9/1989 | Sunagawa et al. | 369/13.31 |
| 4,885,732 A | * | 12/1989 | Sunagawa et al. | 369/44.12 |
| 5,153,860 A | * | 10/1992 | Sunagawa et al. | 369/13 |
| 5,198,838 A | * | 3/1993 | Sugiura | 347/256 |
| 5,418,765 A | * | 5/1995 | Misawa et al. | 369/44.12 |
| 5,835,472 A | * | 11/1998 | Horie et al. | 369/110.02 |

* cited by examiner

Primary Examiner—John D. Lee
Assistant Examiner—Sarah U. Song
(74) Attorney, Agent, or Firm—Young & Thompson

(57) ABSTRACT

The light beam emitted by the light source is irradiated on the information storage medium via the optical system. The reflected light beam is irradiated by the light guide path element. Then by the grating, a part of the light beam is input-coupled with the waveguide layer while the remaining part is transmitted and received by the light receiving portion below. An adjustment is made such that the coupling efficiency to the waveguide layer by the first grating pattern is maximized when the relative distance between the information storage medium and the optical system increases, and the coupling efficiency to the waveguide layer by the second grating pattern is maximized when the relative distance between the information storage medium and the optical system decreases. In the light receiving portion, divided according to the respective grating patterns, the received light quantity becomes minimum when the respective coupling efficiencies are maximum.

8 Claims, 9 Drawing Sheets

$\theta = 27.5°$ $\theta_1 = 27.433°$ $\theta = 27.5°$ $\theta 2 = 27.568°$

LIGHT GUIDE PATH ELEMENT AND OPTICAL PICKUP

BACKGROUND OF THE INVENTION

1. Field of the Invention

The present invention relates to a light guide path element including a grating for input-coupling or transmitting a light beam a light guide path by mean of a fine repetitive structure formed on the light guide path and a light receiving portion for receiving the light beam. The present invention also relates to an optical pickup for generating a focus error signal by using the light guide path element.

2. Description of the Prior Art

Recently, there has been largely developed an optical pickup including a light guide path element by utilizing the integrated circuit technique. An optical pickup of this kind is configured by a grating, a light receiving portion and a light guide path element, which are integrally formed on a substrate. The grating is used to establish an input-coupling or an output-coupling of the light beam between an external optical system and a light guide path element, thereby achieving the function of an optical pickup. Thus, a downsized, reliable optical pickup can be achieved.

However, the positioning of the light receiving portion in the integration process is a problem if an optical pickup for CD and/or DVD is configured by using the above-mentioned light guide path element. Generally, the optical pickup of that kind is configured such that the light beam reflected by an information storage medium is input-coupled with the light guide path element. A first light receiving portion is provided under the light guide path element to detect an RF signal and a tracking error, and a second light receiving portion is provided to detect a focus error. In such a configuration, in the case of focus error detection, a broadly-known technique such as the beam size method requires that a light quantity enough to differentiate the focus states of the respective beams is input-coupled with the light guide path element, thereby leading the light beams to the second light receiving portion. At the same time, in detecting the RF signal or the tracking error, in order to ensure the light quantity and stability, it is preferred that the guided light quantity after the input-coupling is as small as possible to increase the light quantity at the first light receiving portion.

Further, the second light receiving portion for use in the focus error detection is required to be arranged with a certain distance from the first light receiving portion for use in the tracking error detection, and hence the total area of the light guide path element necessarily becomes large. It becomes a bar to downsize the light guide path element and causes the increased cost.

SUMMARY OF THE INVENTION

It is an object of the present invention to provide a downsized, low-cost optical pickup including a light guide path element, in which the optical pickup function is achieved by a single light receiving portion.

It is another object of the present invention to provide the light guide path element to be used in the above-mentioned optical pickup.

According to one aspect of the present invention, there is provided a light guide path element for use in an optical pickup which irradiates a light beam emitted by a light source via an optical system onto an information storage medium and receives the light beam reflected therefrom, the light guide path element including: a waveguide layer for propagating the light beam; a grating for input-coupling a part of the light beam reflected by the information storage medium with the waveguide layer and for transmitting a remaining part of the light beam; and a light receiving portion for receiving light beam transmitted through the grating, wherein the waveguide layer, the grating and the light receiving portion are formed in a laminated manner to form a laminate structure, wherein the grating includes a first grating pattern adapted to an irradiation state of the light beam when the information storage medium and the optical system move away from each other by a predetermined distance to maximize a coupling efficiency with the waveguide layer, and a second grating pattern adapted to an irradiation state of the light beam when the information storage medium and the optical system approach each other by the predetermined distance to maximize a coupling efficiency with the waveguide layer, and wherein the light receiving portion includes a first light receiving area corresponding to the first grating pattern and a second light receiving area corresponding to the second grating pattern.

In accordance with the above invention, the light beam emitted by the light source is irradiated on the information storage medium via the optical system. The reflected light beam is irradiated by the light guide path element. Then, by the grating serving as the input-coupler to the waveguide layer, a part of the light beam is input-coupled with the waveguide layer while the remaining part is transmitted and received by the light receiving portion below. At this time, according to the positional relationship between the information storage medium and the optical system, an adjustment is made such that the coupling efficiency to the waveguide layer by the first grating pattern is maximized when the relative distance between the information storage medium and the optical system is increasing, and the coupling efficiency to the waveguide layer by the second grating pattern is maximized when the relative distance between the information storage medium and the optical system is decreasing. In the light receiving portion which is divided according to the respective grating patterns, the received light quantity becomes minimum when the respective coupling efficiencies are maximum.

Therefore, by taking the difference of the light receiving outputs of the respective light receiving areas, an S-shape curve characteristic can be obtained and a focus error signal can be readily produced. Thus, the focus error detection, which conventionally required a certain light path length to the light receiving portion, can be performed immediately below the grating. This can achieve the reduction of the light receiving portion area, and provide further downsized and low cost light-integrated optical pickup.

The first grating pattern and the second grating pattern may include a chirped, curved grating to be adapted to the irradiation state of the incident light beam. By this, when the light beam reflected by the information storage medium is irradiated on the grating, a necessary characteristic is applied to the light beam irradiated as a converging light by means of the chirped, curved grating pattern applied to the first and the second grating patterns, and then the light beam is input-coupled with the waveguide layer. Therefore, the coupling efficiency with the waveguide layer according to the positional relationship between the information storage medium and the optical system may be controlled with improved accuracy, and the focus error signal can be produced using a sharp S-shaped curve. This can achieve the downsizing and the performance improvement of the light integrated optical pickup.

The first grating pattern and the second grating pattern may be alternately arranged, and the light receiving portion may be divided into strip-like shape areas corresponding to the alternate arrangement of the first and the second grating patterns. By this, when the light beam reflected by the information storage medium is irradiated on the grating, the light beam passes through many strip-shaped areas. For example, since the odd-numbered and the even-numbered areas apply two different characteristics and the light receiving portion is divided in the same way, the focus error signal can be easily obtained. In addition, high light receiving performance can be obtained by maintaining high effective NA.

The light guide path element may further include a separation layer, formed in the laminated manner at the top of the laminate structure, for selectively reflecting and transmitting the light beam in accordance with a phase difference given to the light beam, and the separation layer may function as a beam splitter arranged between the light source and the optical system.

According to this invention, the light beam emitted by the light source is reflected by the separation layer provided at the top of the laminate structure and is irradiated on the information storage medium. The reflected light beam is applied with necessary phase difference, passes through the separation layer and reaches the grating. Thereafter, the focus error signal is produced based on the light receiving outputs from the light receiving portion. Therefore, the light guide path element may have various functions, and it is possible to provide an optical pickup which has simple configuration and is easily downsized.

According to another aspect of the present invention, there is provided an optical pickup which irradiates a light beam emitted by a light source via an optical system onto an information storage medium and receives the light beam reflected therefrom, including: a light guide path element including: a waveguide layer for propagating the light beam; a grating for input-coupling a part of the light beam reflected by the information storage medium with the waveguide layer and for transmitting a remaining part of the light a beam; and a light receiving portion for receiving light beam transmitted through the grating, wherein the waveguide layer, the grating and the light receiving portion are formed in a laminated manner to form a laminate structure, wherein the grating includes a first grating pattern adapted to an irradiation state of the light beam when the information storage medium and the optical system move away from each other by a predetermined distance to maximize a coupling efficiency with the waveguide layer, and a second grating pattern adapted to an irradiation state of the light beam when the information storage medium and the optical system approach each other by the predetermined distance to maximize a coupling efficiency with the waveguide layer, wherein the light receiving portion includes a first light receiving area corresponding to the first grating pattern and a second light receiving area corresponding to the second grating pattern, and wherein a focus error signal is produced based on a difference signal of light receiving signals outputted by the light receiving areas.

In accordance with the above invention, the light beam emitted by the light source is irradiated on the information storage medium via the optical system including a collimator lens and an objective lens. The reflected light beam is irradiated on the light guide path element. Then, by the grating serving as the input-coupler to the waveguide layer, a part of the light beam is input-coupled with the waveguide layer while the remaining part is transmitted and received by the light receiving portion below. At this time, according to the positional relationship between the information storage medium and the optical system, an adjustment is made such that the coupling efficiency to the waveguide layer by the first grating pattern is maximized when the relative distance between the information storage medium and the optical system is increasing, and the coupling efficiency to the waveguide layer by the second grating pattern is maximized when the relative distance between the information storage medium and the optical system is decreasing. In the light receiving portion which is divided according to the respective grating patterns, the received light quantity becomes minimum when the respective coupling efficiencies are maximum. By taking the light receiving outputs from the light receiving areas, the focus error signal is obtained.

Therefore, the focus error signal can be readily produced. Thus, the focus error detection, which conventionally required a certain light path length to the light receiving portion, can be performed just below the grating. This can achieve the reduction of the light receiving portion area, and provide further small and low cost light-integrated optical pickup.

According to still another aspect of the present invention, there is provided an optical pickup which irradiates a light beam emitted by a light source via an optical system onto an information storage medium and receives the light beam reflected therefrom, including: a light guide path element including: a grating element for diffracting a part of the light beam reflected by the information storage medium and for transmitting a remaining part of the light beam; and a light receiving portion for receiving light beam transmitted through the grating element, wherein the grating element includes a first grating pattern adapted to an irradiation state of the light beam when the information storage medium and the optical system move away from each other by a predetermined distance to maximize a diffraction efficiency, and a second grating pattern adapted to an irradiation state of the light beam when the information storage medium and the optical system approach each other by the predetermined distance to maximize a diffraction efficiency, wherein the light receiving portion includes a first light receiving area corresponding to the first grating pattern and a second light receiving area corresponding to the second grating pattern, and wherein a focus error signal is produced based on a difference signal of light receiving signals outputted by the light receiving areas.

In accordance with the above invention, the light beam emitted by the light source is irradiated on the information storage medium via the optical system including a collimator lens and an objective lens. The reflected light beam is irradiated on the grating element. The grating element diffracts a part of the light beam and transmits the remaining part of the light beam to be received by the light receiving portion. At this time, according to the positional relationship between the information storage medium and the optical system, an adjustment is made such that the diffraction efficiency to the waveguide layer by the first grating pattern is maximized when the relative distance between the information storage medium and the optical system is increasing, and the diffraction efficiency to the waveguide layer by the second grating pattern is maximized when the relative distance between the information storage medium and the optical system is decreasing. In the light receiving portion which is divided according to the respective grating patterns, the received light quantity becomes minimum when the respective diffraction efficiencies are maximum. By taking the light receiving outputs from the light receiving areas, the focus error signal is obtained.

Therefore, the focus error signal can be readily produced. Thus, the focus error detection, which conventionally required a certain light path length to the light receiving portion, can be performed closely to the grating element. This enables downsizing the whole size of the optical pickup.

An RF signal and a tracking error signal may be produced based on the light receiving signals from the light receiving areas. By this, when the light beam is received, the focus error signal, the RF signal and the tracking error signal can be produced. Therefore, a small and inexpensive optical pickup with simple circuit configuration may be provided.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

Figure 1:
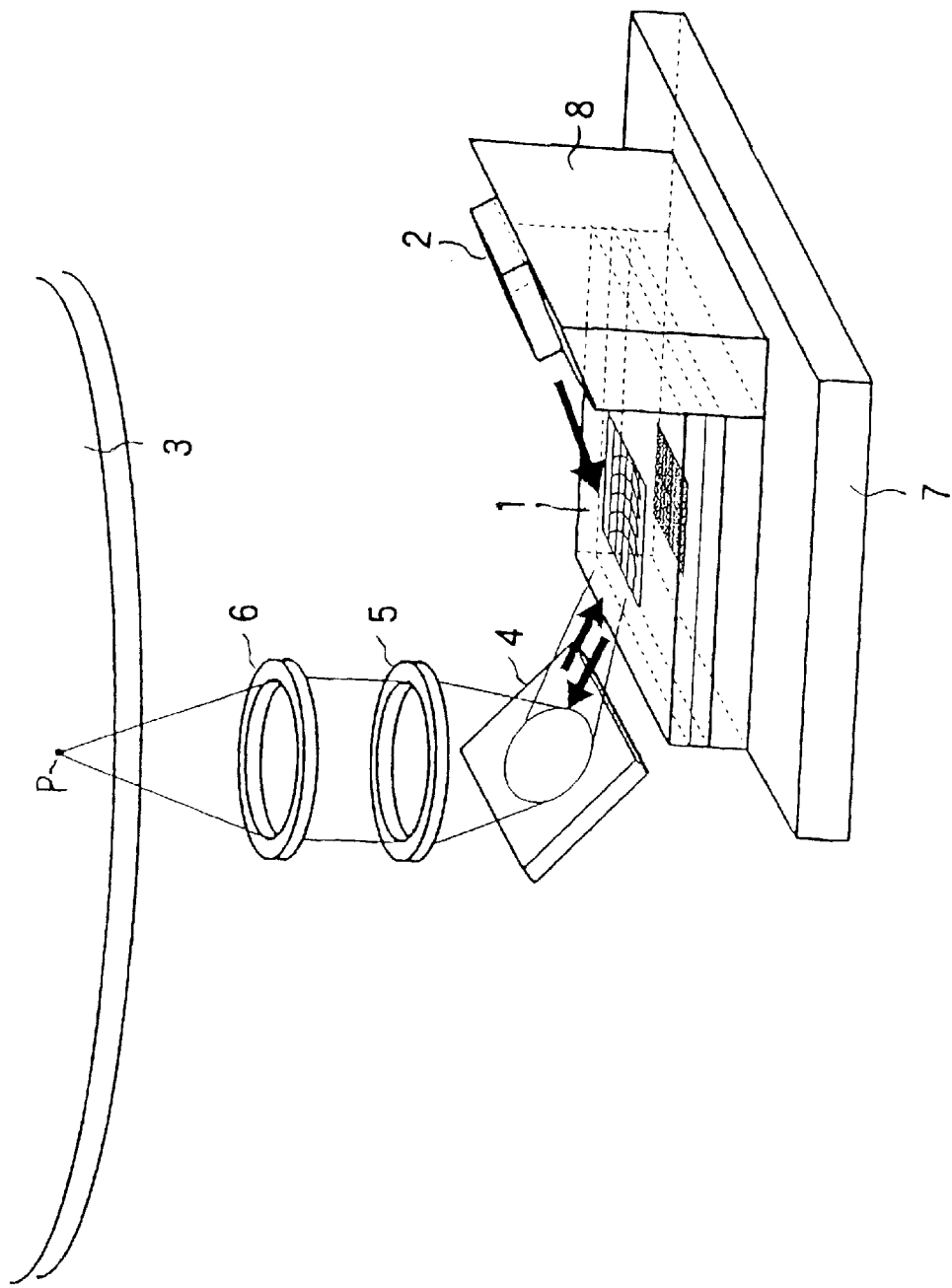
FIG. 1 is a perspective view showing a whole configuration of an optical pickup according to the embodiment of the present invention.

FIG. 1 is a perspective view showing an overall configuration of an optical pickup according to an embodiment of the present invention. The optical pickup shown in FIG. 1 includes a light guide path device 1, a semiconductor laser 2 for emitting a light beam, and an optical system, including a reflective mirror 4, a collimator lens 5 and an object lens 6, for irradiating the light beam onto an optical disc 3. With this arrangement, the light guide path device 1 is bonded onto a mount base 7 and has a laminated structure described later in detail. The semiconductor laser 2 is attached to a sub-mount 8, and the sub-mount 8 is bonded onto the mount base 7 such that the light guide path device 1 and the semiconductor laser 2 maintain a certain positional relationship with each other. For example, the semiconductor laser 2 may have the wavelength 780 nm adapted to CD and CD-R or the wavelength 650 nm adapted to DVD.

The light beam emitted by the semiconductor laser 2 is reflected by the upper surface of the light guide path device 1 due to a function described later. Then, the light beam is reflected by the reflective mirror 4, is changed to a parallel beam by means of the collimator lens 5, and is converged on the information recording surface of the optical disc 3 via the objective lens 6, thereby forming a beam spot P. The reflected light from the beam spot P again passes through the objective lens 6, the collimator lens 5 and the reflective mirror 4 and is received by the light receiving portion of the light guide path device 1. If the objective lens 6 and the optical disc 3 have an appropriate distance therebetween, the beam spot P is in a just in-focus state, enabling accurate information reproduction. On the contrary, if the relative position of the objective lens 6 moves toward and away from the optical disc 3 and the relative distance between them varies, the beam spot becomes defocus state, degrading the reproduction performance. Therefore, the focus error signal should be detected to maintain the in-focus state with respect to the optical disc 3. In this embodiment, the focus error is detected by the inventive structure of the light guide path device 1 described later.

Figure 2:
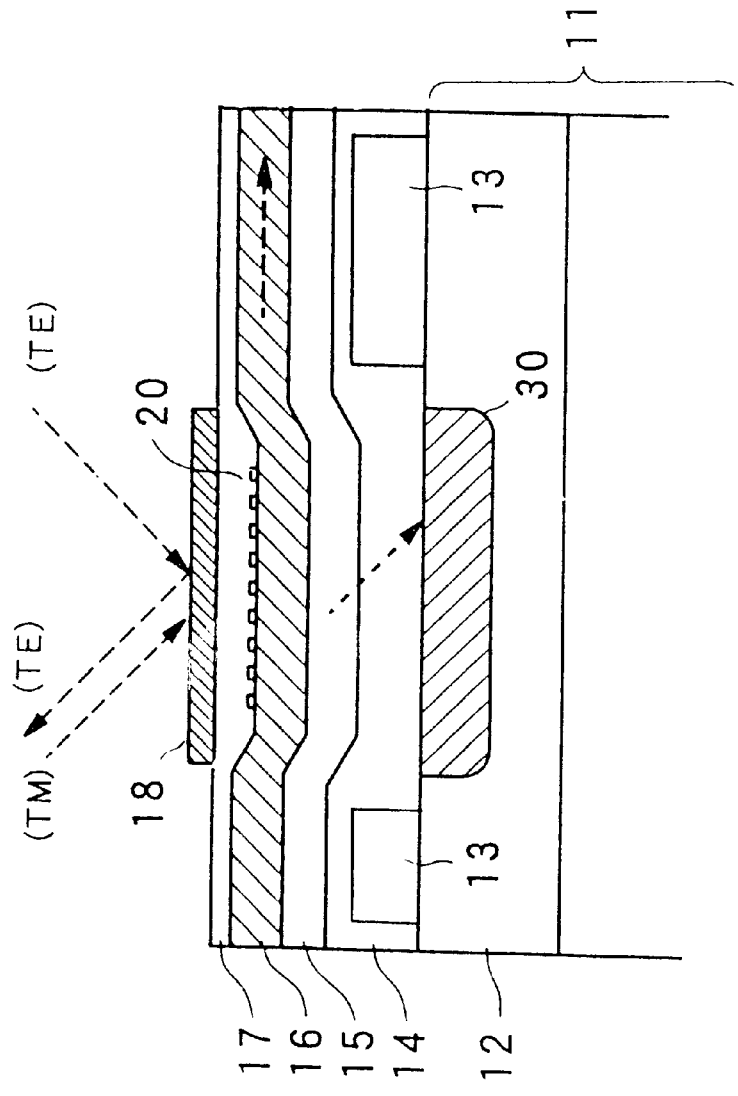
FIG. 2 is a sectional view showing the configuration of the light guide path device of the embodiment.

FIG. 2 shows, in sectional view, the structure of the light guide path device 1 according to the embodiment of the present invention. The light guide path device 1 shown in FIG. 2 is provided with, from its lower portion to its upper portion, a semiconductor substrate 11, an epitaxial layer 12 which occupies the uppermost portion of the semiconductor substrate 11, an aluminum shielding layer 13, a first SOG (Spin On Glass) layer 14, an SiO$_2$ layer 15, a waveguide layer 16, a second SOG layer 17 and an out-wardpath/inward-path separation film 18, in a laminated fashion. A grating 20 is provided on the top of the waveguide layer 16. The epitaxial layer 12 includes a light receiving portion 30. With this arrangement, the semiconductor substrate 11 may be an N-type silicon substrate, for example. The epitaxial layer 12 in which single crystal film is grown by the epitaxial growth is formed on the semiconductor layer 11, and then P-type diffusion is applied according to predetermined arrangement to form the light receiving portion 30. The upper surface of the epitaxial layer 12 other than the light receiving portion 30 is formed with the aluminum shielding layer 13 to shield the light coming from above.

The first SOG layer 14 and the second SOG layer 17 serve as buffer between the multi-layer structure. The first SOG layer 14 is formed on the epitaxial layer 12 to eliminate the level difference between the epitaxial layer 12 and the aluminum shielding layer 13, and the second SOG layer 17 is formed on the waveguide layer 16. The thickness of the first SOG layer 14 and the second SOG layer 17 may be freely varied dependently upon the structure of their upper and lower layers and the film forming condition. The waveguide layer 16 is made of coning 7059 and formed to have the thickness 0.65 $\mu$m. The waveguide 16 functions as a light guide path in which the light beam input-coupled via the grating 20 propagates in the waveguide mode. The grating 20 is made of TiO$_2$ and is formed to have the thickness of 0.1 $\mu$m. The grating 20 is formed with a predetermined grating pattern, and functions as a coupler which achieves input-coupling of the light beam having a predetermined wavelength. The SiO$_2$ layer 15 is made of SiO$_2$ and is formed under the waveguide layer 16 with the thickness 0.7 $\mu$m. The SiO$_2$ layer functions as a clad layer of the light guide path.

In the structure described above, an appropriate refractive index should be set to appropriately couple the light beam with the waveguide layer 16 and permit the light beam to effectively propagate in the waveguide mode. Specifically, the waveguide layer 16 has the refractive index 1.53, the SiO₂ layer 15 has the refractive index 1.47, the first SOG layer 14 and the second SOG layer 17 have the refractive index 1.43, and the grating 20 has the refractive index 2.0, respectively. After the surface polishing of the second SOG layer 17, the outward-path/inward-path separation film 18 is formed on the second SOG layer 17 by deposition process. The outward-path/inward-path separation film 18 is comprised of multi-layer such as dielectric, and functions as a beam splitter.

Next, the description will be given of the operation to make the light guide path device 1 function as an optical pickup. It is noted that, in FIG. 2, the light beam progressing direction is shown as the broken arrows. In FIG. 2, the light beam emitted by the semiconductor laser 2 is incident upon the outward-path/inward path separation film 18 in an oblique direction. The outward-path/inward-path separation film 18 is designed to reflect the TE-mode light beam and transmits the TM-mode light beam, and the semiconductor laser 2 is arranged such that the TE-mode light beam is incident upon the outward-path/inward-path separation film 18. Thus, the TE-mode light beam is reflected by the outward-path/inward-path separation film 18 and is converged on the information recording surface of the optical disc 3 via the optical system shown in FIG. 1. By arranging a λ/4 wavelength plate (not shown) within the optical system, the λ/4 wavelength plate converts the reflected light beam into the TM-mode light beam, and the TM-mode light beam transmits through the outward-path/inward-path separation film 18.

Then, by means of the grating 20, a part of the light beam is input-coupled with the waveguide layer 16 with a desired coupling efficiency, and the remaining part of the light beam is transmitted through the grating 20 and reaches the light receiving portion 30. Thus, the grating 20 serves as a coupler for the light beam. The grating 20 is a chirped and curved grating, and the repetition period and the curvature of the grating pattern is precisely adjusted in consideration of the irradiation condition and the focusing position of the reflected converging light. The height of the grating structure is appropriately adjusted to input-couple the light beam from the grating 20 to the waveguide 16 with a desired coupling efficiency. In this embodiment, the RF signal, the tracking error signal and the focus error signal are all detected based on the output by the light receiving portion 30. The specific detection method will be described later.

Figure 3A:
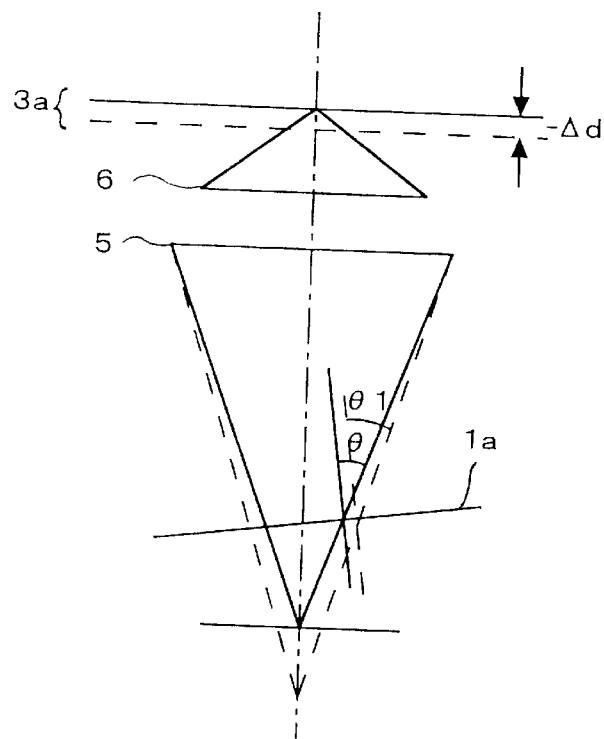
FIGS. 3A and 3B are diagrams showing the focus state of a light beam when an optical disc is in a "NEAR" state.
Figure 3B:
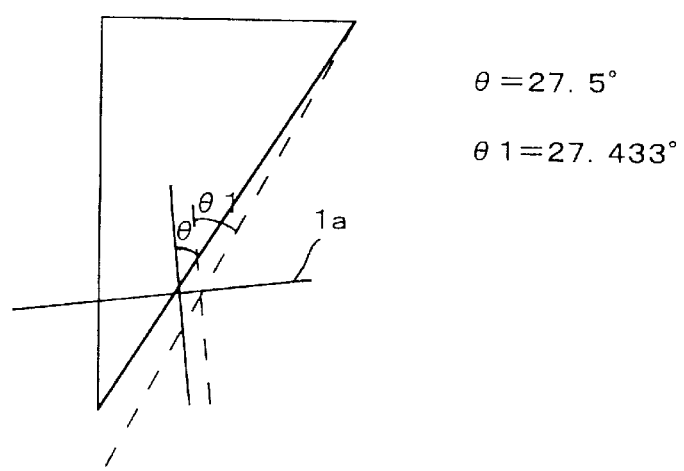
Figure 4A:
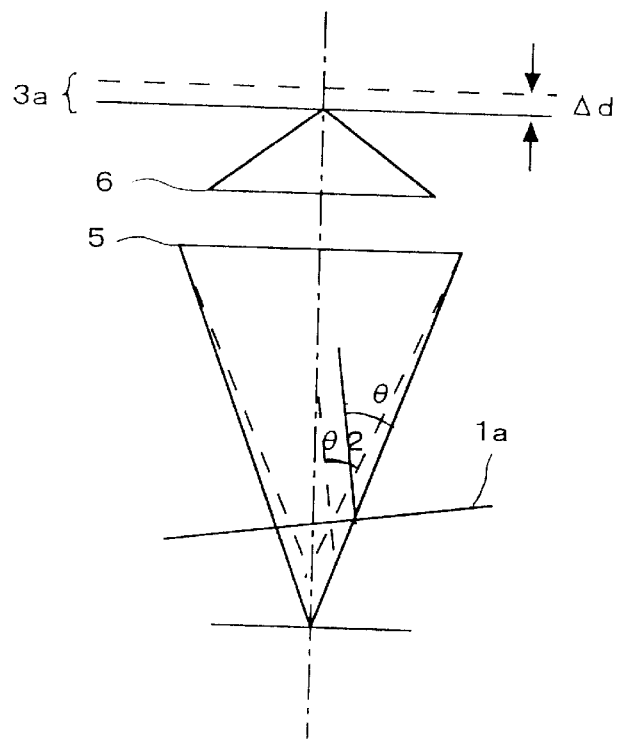
FIGS. 4A and 4B are diagrams showing the focus state of a light beam when an optical disc is in a "FAR" state.
Figure 4B:
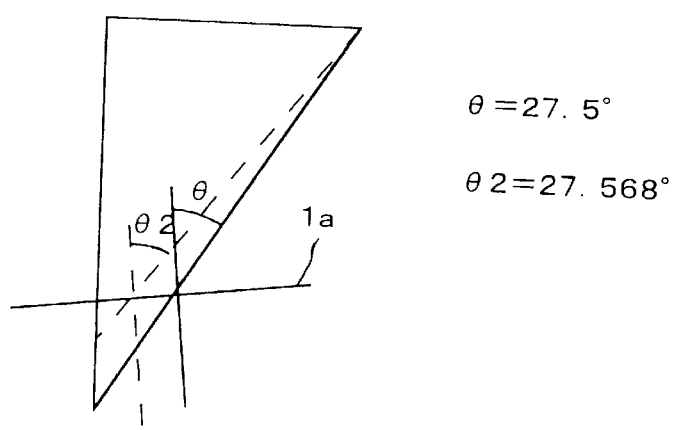

Next, the principle of the focus error detection of the embodiment will be described with reference to FIGS. 3 and 4. FIGS. 3 and 4 show the focus state variation of the irradiated light beam when the relative position of the optical disc 3 with respect to the objective lens 6 moves to the far side and the near side, respectively. While the light beam incident on the incident surface 1*a* of the light guide path device 1 shows a complicated propagation characteristic in practice, FIGS. 3 and 4 show the light beam irradiation state in a linear manner, for the sake of simplicity. In this embodiment, it is supposed that the movement amount Δd corresponding to the variation range of the focused state is Δd ±10 μm. FIGS. 3A and 3B show the case in which the optical disc 3 approaches the objective lens 6, Δd=−10 μm, corresponding to "NEAR" state, and FIGS. 4A and 4B show the case in which the optical disc 3 moves away from the objective lens 6, Δd=+10 m, corresponding to "FAR" state. FIGS. 3A, 3B, 4A and 4B show the information recording surface 3*a* of the optical disc 3 and the irradiated light beam when the appropriate position, Δd=0 μm, is ensured as the solid lines. In addition, FIGS. 3A, 3B, 4A and 4B show the information recording surface 3*a* and the optical disc 3 and the irradiated light beam when the light beam is in the "NEAR" or "FAR" state and is therefore shifted by Δd=±10 μm as the broken lines.

As shown by the solid lines in FIGS. 3A and 4A, when the information recording surface 3*a* is at the position where Δd=0 μm, the light beam passes through the collimator lens 5 and the objective lens 6 and is focused on the information recording surface 3*a* of the optical disc 3. Then, the reflected light beam returns via the same path, is incident on the incident surface 1*a* of the light guide path device 1 and reaches the light receiving portion 30. It is noted that, in FIGS. 3A and 4A, the light beam irradiating states are expressed as two triangles having the apexes showing the in-focus positions, for the sake of simplicity. Here, the reflected light beam is incident on the incident surface 1*a* of the light guide path device in an oblique direction correspondingly to the arrangement shown in FIG. 1, and the light beam is a converging light. In this embodiment, the incident angle θ of the light beam with respect to the normal line of the incident surface 1*a* is 27.5° at the outermost circumferential portion where the converging light takes a minimum incident angle θ, as shown in FIGS. 3B and 4B.

On the other hand, when the optical disc 3 is in the "NEAR" or "FAR" state, the in-focus position of the light beam irradiated on the information recording surface 3*a* of the optical disc 3 via the optical system is shifted, and accordingly the in-focus position of the reflected light is also shifted. Therefore, when the light beam is incident on the incident surface 1*a* of the light guide path device 1, the incident angle of the outermost portion of the above converging light is shifted from the above θ, and the incident state of the light beam changes. This embodiment utilizes this phenomenon to detect the focus error.

Namely, as shown in FIG. 3A by the broken lines, when the optical disc 3 is in the "NEAR" state, the in-focus position with respect to the information recording surface 3*a* of the optical disc 3 is shifted rearward by 10 μm, and the in-focus position of the reflected light beam is also shifted rearward. Therefore, as shown in FIG. 3B, the converging degree of the converging light is reduced, and the incident angle θ 1 at the outermost portion thereof becomes 27.433°, smaller than the angle θ, as shown in FIG. 3B.

When the optical disc 3 is in the "FAR" state as shown in FIG. 4A, the in-focus position with respect to the information recording surface 3*a* of the optical disc 3 is shifted forward by 10 μm, and the in-focus position of the reflected light beam is also shifted forward. Therefore, as shown in FIG. 4B, the converging degree of the converging light increases, and the incident angle θ 2 at the outermost portion thereof becomes 27.568°, larger than the angle θ, as shown in FIG. 4B. As described above, the coupling efficiency with the waveguide 16 in the light guide path device 1 is determined based on the irradiation state of the light beam and the grating pattern. In this embodiment, the grating 20 has two different grating patterns, wherein one of the patterns permits the input-coupling with the waveguide layer 16 at the time of the irradiation state shown in FIGS. 3A and 3B, and the other pattern permits the input-coupling with the waveguide layer 16 at the time of the irradiate state shown in FIGS. 4A and 4B.

Figure 5:
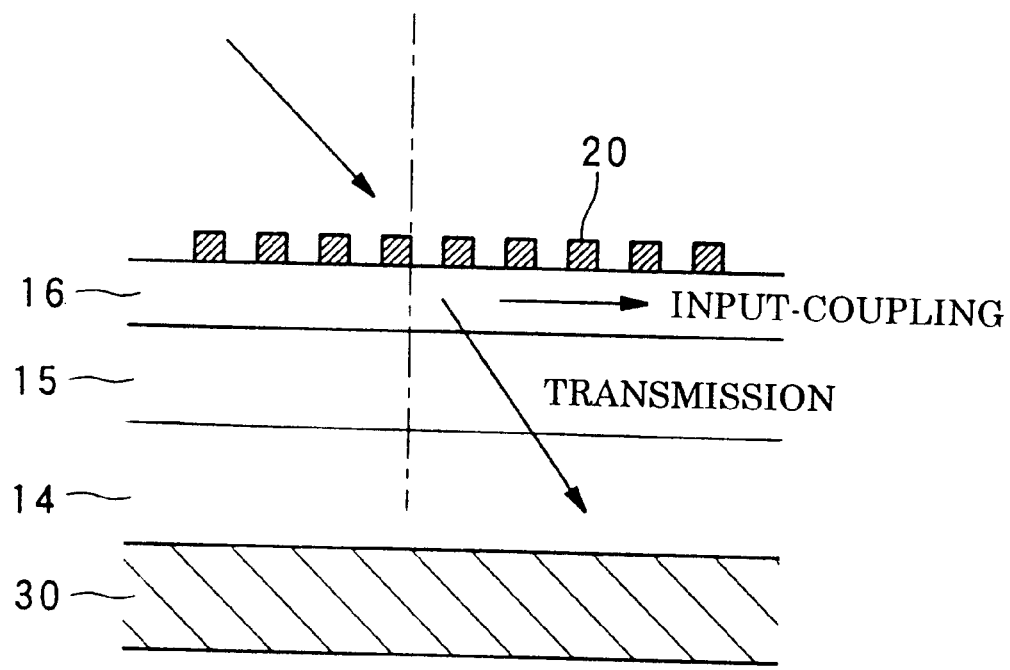
FIG. 5 is a sectional view showing a structure of a grating of the embodiment.

Next, the structure and the characteristic of the grating 20 will be described with reference to FIGS. 5 and 6. FIG. 5 shows, in section, the structure of the light guide path device 1 including the grating 20. In the grating 20, the grating pattern is formed by forming the repetitive convexoconcave shapes on the surface of the waveguide layer 16. The repetition period of the grating pattern is 0.6 μm, for example. As shown in FIG. 5, the light beam having a predetermined wavelength is incident on the grating 20 with a constant incident angle after passing through the outward-path/inward-path separation film 18. The grating pattern is adjusted to meet various conditions relating to the light beam wavelength and incident angle. The input-coupled light beam propagate to the right direction in FIG. 5 within the waveguide layer 16 under the grating 20. On the other hand, the light beam not being input-coupled passes through the grating 20, the waveguide layer 16, the $SiO_2$ layer 15 and the first SOG layer 14, and is received by the light receiving portion 30 below.

Figure 6:
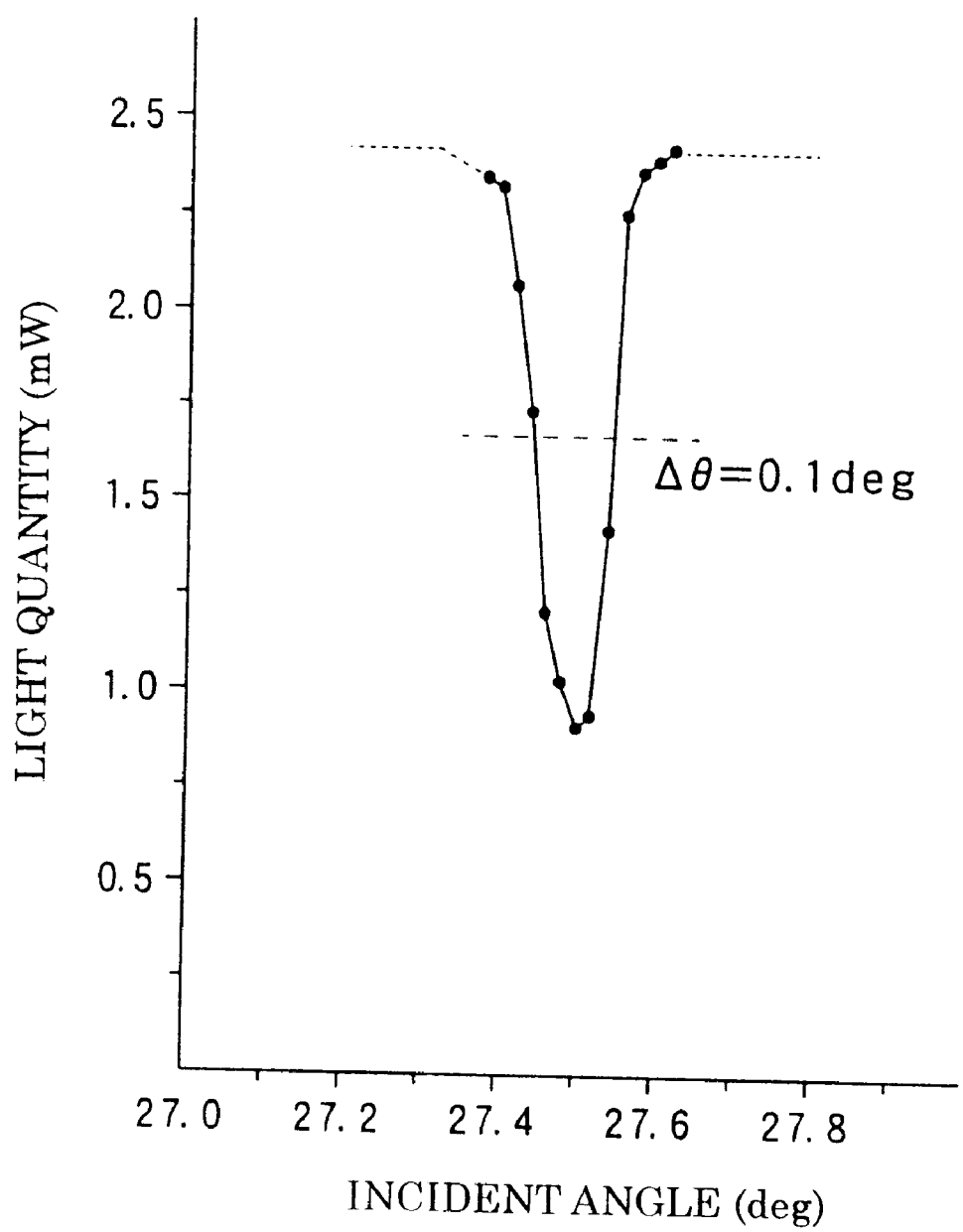
FIG. 6 is a graph showing a variation of light quantity received by a light receiving portion due to an incident angle change when the light beam is incident upon the grating of the invention.

FIG. 6 shows the variation of the received light quantity by the light receiving portion 30, due to the characteristic of the grating in FIG. 5, according to the incident angle of the light beam described with reference to FIG. 3. As seen in FIG. 6, the received light quantity suddenly decreases at a given incident angle, and this means that the there is an optimum peak due to the input-coupling characteristic of the grating 20. In other words, at the incident angle other than this peak, the light beam passed through the grating 20 is transmitted and received by the light receiving portion 30. At the incident angle corresponding to the peak, the light beam is input-coupled and propagates through the waveguide layer 16, and hence the light quantity received by the light receiving portion 30 decreases by that amount. Thus, by determining the appropriate grating pattern by an experiment or the like according to the wavelength and the incident angle of the light beam, the light beam of only a desired incident angle can be selectively received by the light receiving portion 30.

In practice, it is preferred that the grating pattern has chirped curves. Namely, the light beam is irradiated as the converging light and the incident angle finely varies dependently upon the irradiated area, the grating pattern may be configured by slightly varying the repetition period of the convexoconcave shapes two-dimensionally in accordance with the irradiated state of the light beam step by step. Thus, the converging light irradiated within a given range may be appropriately guided and input-coupled with the waveguide layer 16.

In the case of this embodiment, two grating patterns are adjusted, on the characteristic shown in FIG. 6, in correspondence with the "NEAR" and "FAR" states of the optical disc 3 such that only the peaks are different. Namely, one grating pattern is adapted to the irradiation state of FIG. 3A, and the other pattern is adapted to the irradiation state of FIG. 3B. Therefore, the grating patterns may be used for the focus error detection. These two grating patterns are formed in a single grating 20 with the aid of the inventive pattern forming method to simplify the configuration.

Next, the principle of the focus error detection in this embodiment will be described with reference to FIGS. 7A and 7B, which show the received light level detected by the light receiving portion 30.

Figure 7A:
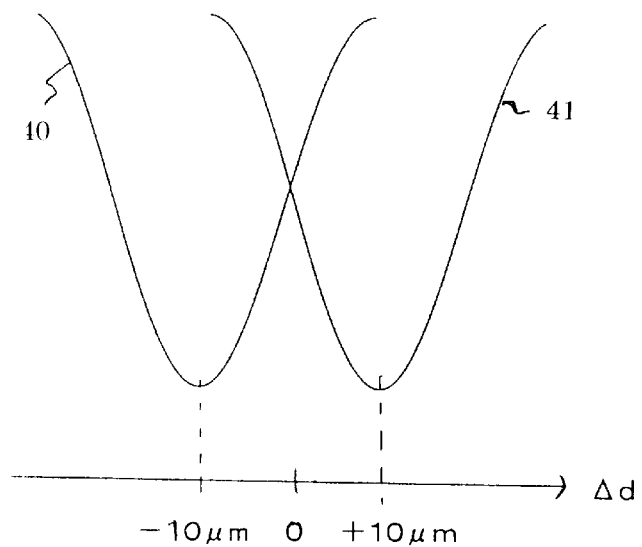
FIGS. 7A and 7B are graphs showing received light levels detected by the light receiving portion after passing through the grating of the invention.

FIG. 7A shows the variation of the received light level according to the movement amount Δd of the optical disc 3 for the above-mentioned two irradiation states. The first characteristic 40 corresponds to the "NEAR" state of the optical disc 3, i.e., Δd=−10 μm, and the second characteristic 41 corresponds to the "FAR" state of the optical disc 3, i.e., Δd=+10 μm. The grating pattern is adjusted such that the characteristics 40 and 41 in FIG. 7A have the same curved shapes and the bottom peaks of the falling levels correspond to the points Δd=−10 μm and Δd=+10 μm, respectively.

Figure 7B:
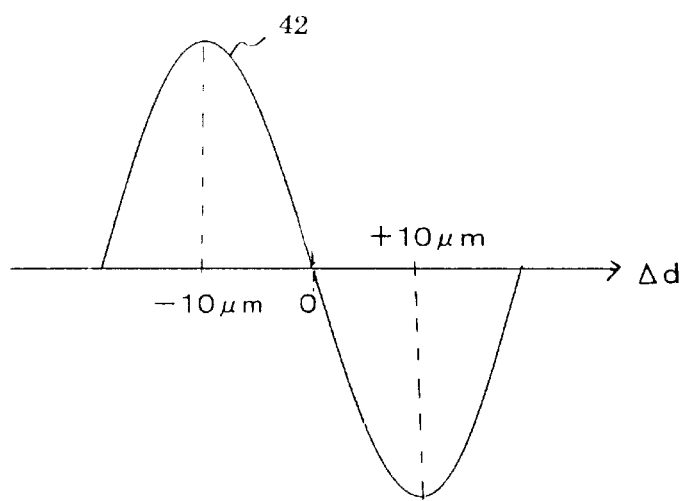

FIG. 7B shows the output level 42 which is the difference of the characteristic 40, corresponding to the point Δd=−10 μm, and the characteristic 41, corresponding to the point Δd=+10 μm, each shown in FIG. 7A. As seen in FIG. 7B, the output level 42 varies according to the S-shaped curve. On this S-shaped curve, the output level becomes zero when the optical disc 3 is at the appropriate position where Δd=0 μm and the absolute value of Δd exceeds 10 μm. If the optical disc 3 moves from the appropriate position where Δd=0 μm to the "NEAR" state where Δd=−10 μm, the output level varies in positive direction. If the optical disc moves from the appropriate position where Δd=−10 μm to the "FAR" state where Δd=+10 μm, the output level varies in negative direction. Therefore, within the range from Δd=−10 μm to Δd=+10 μm, the focus state of the optical disc 3 may be detected by reading the variation of the output level 42 which varies in the S-shaped manner responsive to the change of θd.

Figure 8A:
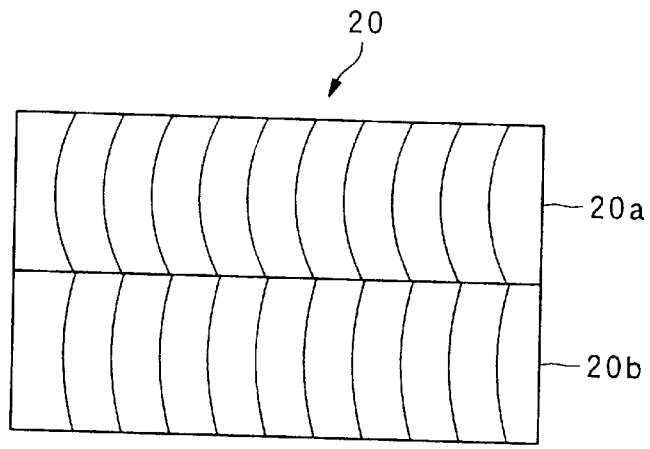
FIGS. 8A and 8B are diagrams showing the configuration of a grating and a light receiving portion used for the focus error detection using two-divided pattern.
Figure 8B:
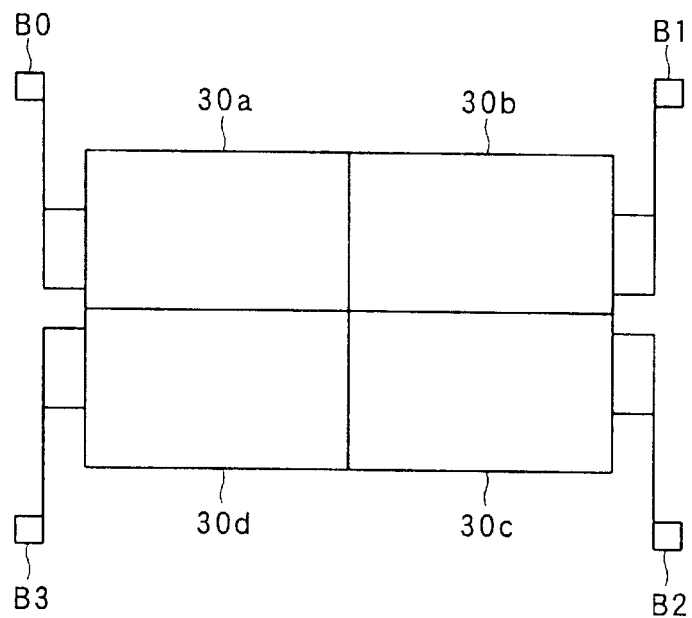
Figure 9A:
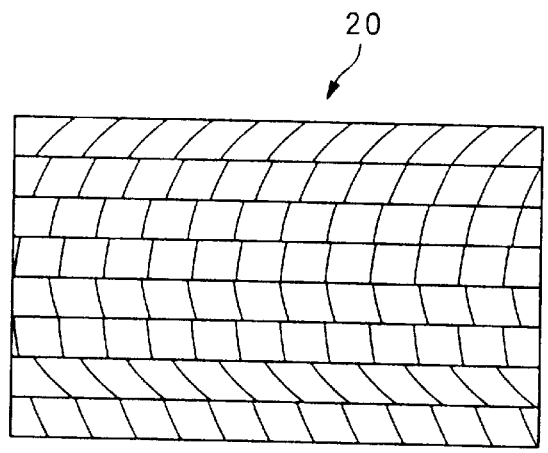
FIGS. 9A and 9B are diagrams showing the configuration of a grating and a light receiving portion used for the focus error detection using strip-like patterns.
Figure 9B:
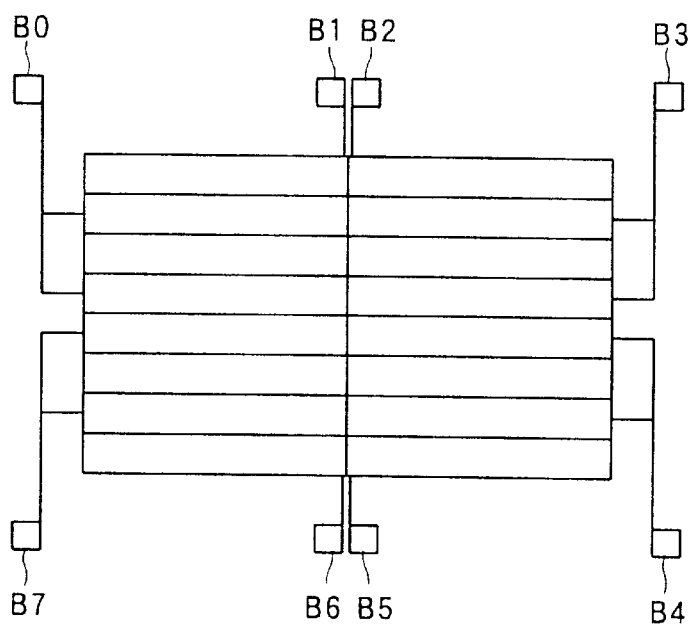

Next, the description will be given of the configuration of the grating 20 and the light receiving portion 30 in the case where the above-mentioned focus error detection is carried out in this embodiment, by referring to FIGS. 8A, 8B, 9A and 9B. Here, two different methods, by which the grating 20 and the light receiving portion 30 correspond to the "NEAR" and "FAR" states, will be described. One uses a two-divided pattern as shown in FIGS. 8A and 8B, and the other uses a strip-like pattern as shown in FIG. 9A and 9B. It is noted that FIGS. 8A and 9A show the configuration of the grating 20, and FIGS. 8B and 9B show the configuration of the light receiving portion.

In the grating 20 shown in FIG. 8A, the first area 20a corresponding to the "NEAR" state and the second area 20b corresponding to the "FAR" state are arranged side by side to form the whole grating pattern. The first area 20a and the second area 20b have patterns slightly different from each other in their repetition period and the curvature, correspondingly to the irradiation state of the light beam to which each areas should be adapted.

On the other hand, the light receiving portion 30 shown in FIG. 8B is divided to correspond to the divided shape of the grating 20 shown in FIG. 8A. The light receiving portion 30 is formed as a normal four-divided shape so as to enable the detection of the RF signal and the tracking error signal in addition to the above-mentioned focus error signal. In this view, as shown in FIG. 8B, the light receiving portion 30 is divided into four areas 30a, 30b, 30c and 30d by the vertical dividing line aligned with the divisional line of the grating 20 and the lateral dividing line perpendicular to the vertical dividing line. These divided areas 30a to 30d are connected to the bonding pads B0 to B3 via aluminum wiring to output the light receiving signals from the respective areas. In the light receiving portion 30 in FIG. 8B, by utilizing the light receiving signals from the bonding pads B0 to B3, all of the focus error signal, the RF signal and the tracking error signal can be obtained. Hereinafter, the signals outputted by the bonding pads B0 to B3 are referred to as signals S0 to S3, respectively. The RF signal can be obtained as the total sum of the signals S0 to S3. Supposing that the lateral dividing line described above is in parallel with the track direction of the optical disc 3, the tracking error signal can be obtained by the phase difference method using the output signals S0 to S3. Further, the focus error signal can be obtained as the difference signal (S0+S1)−(S2+S3).

On the other hand, in the grating 20 shown in FIG. 9B, the areas corresponding to the "NEAR" state and the "FAR" state are divided into a plurality of strip-like areas, respectively, and the strip-like areas for "NEAR" state and "FAR" state are alternately arranged to form the whole grating pattern. Namely, from the upper portion of FIG. 9A, the odd-numbered strip-like areas are formed by one of two different grating pattern and the even-numbered strip-like areas are formed by the other one of two different grating patterns, and they are arranged in an alternate manner. The repetition period and the curvature of each divided areas may be the same as that in FIG. 8A. Here, since the grating patterns for both "NEAR" state and "FAR" state may be broadly distributed on the whole area of the grating 20, the substantial NA advantageously increases.

The light receiving portion 30 shown in FIG. 9B is divided according to the divided shape of the grating 20 shown in FIG. 9A. The light receiving portion 30 is divided into the strip-like manner in the lateral direction like the grating 20, and further divided in the vertical direction so that 16 divided area are formed in total. Those divided areas are connected to the bonding pads B0 to B7 via the aluminum wiring in an alternate manner. The bonding pads B1, B2, B4 and B7 are connected to the odd-numbered strip-like areas, and the bonding pads B0, B3, B5 and B6 are connected to the even-numbered strip-like areas. The respective strip-like areas can output the light receiving signals, and the output signals from the bonding pads B0 to B7 are hereinafter referred to as signals S0 to S7. The bonding pads B1, B2, B5 and B6 are connected at their central position via the aluminum wiring not shown.

Also in the case of FIG. 9B, all of the focus error signal, the RF signal and the tracking error signal can be produced. Namely, the RF signal is obtained as the total sum of the output signals S0 to S7. The tracking error signal can be obtained by the phase difference method using the four-divided outputs (S0+S1), (S2+S3), (S4+S5) and (S6+S7). Further, the focus error signal can be obtained as the difference of the signal (S0+S3+S5+S6) and (S1+S2+S4+S7).

In the examples shown in FIGS. 8A, 8B, 9A and 9B, the dividing number of the grating and the light receiving portion 30 are 2 or 8. However, the application of the present invention is not limited to these features, and the division of any number may be introduced in dividing the grating and the light receiving portion. It is noted that the detection accuracy is improved as the dividing number increases, but it has a certain limit in view of the machining accuracy.

As described above, according to the light guide path device 1 of this embodiment, the focus error signal of the optical disc 3 can be generated based on the operation of the grating 20. Therefore, a dedicated light receiving portion for the focus error signal detection is not necessary, and the light receiving portion 30 can produce the RF signal, the tracking error signal and the focus error signal. This may reduce the area of the light guide path device 1 and the optical pickup of small size and low cost can be provided. Further, such an optical pickup can receive sufficient light quantity to produce a stable signal.

The present invention is not limited to the above described embodiments. For example, the above embodiment is directed to the case where the optical pickup is configured by using the light guide path device 1, discrete parts may be used to configure the optical pickup. Namely, a grating element and a light receiving element having the same function as the grating 20 and the light receiving portion 30 are arranged, and the diffraction efficiency of the grating is adjusted by the adjustment of the grating pattern. The optical pickup thus configured can detect the RF signal, the tracking error signal and the focus error signal by a single light receiving element. In addition, since the grating element and the light receiving element can be arranged close to each other, a downsized and low cost optical pickup can be achieved.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 11-034809 filed on Feb. 12, 1999 including the specification, claims, drawings and summary is incorporated herein by reference in its entirety.

What is claimed is:

1. A light guide path element for use in an optical pickup which irradiates a light beam emitted by a light source via an optical system onto an information storage medium and receives the light beam reflected therefrom, the light guide path element comprising:

a waveguide layer for propagating the light beam;

a grating for input-coupling a part of the light beam reflected by the information storage medium with the waveguide layer and for transmitting a remaining part of the light beam; and a light receiving portion for receiving the light beam transmitted through the grating, wherein the waveguide layer, the grating and the light receiving portion are formed in a laminated manner to form a laminate structure, wherein the grating comprises a first grating pattern adapted to an irradiation state of the light beam when the information storage medium and the optical system move away from each other by a predetermined distance to maximize a coupling efficiency with the waveguide layer, and a second grating pattern adapted to an irradiation state of the light beam when the information storage medium and the optical system approach each other by the predetermined distance to maximize a coupling efficiency with the waveguide layer, and wherein the light receiving portion comprises a first light receiving area corresponding to the first grating pattern and a second light receiving area corresponding to the second grating pattern.

2. The light guide path element according to claim 1, wherein the first grating pattern and the second grating pattern comprise a chirped, curved grating to be adapted to the irradiation state of the incident light beam.

3. The light guide path element according to claim 1, wherein the first grating pattern and the second grating pattern are alternately arranged, and wherein the light receiving portion is divided into strip-like shape areas corresponding to an alternate arrangement of the first and the second grating patterns.

4. The light guide path element according to claim 1, further comprising a separation layer, formed in the laminated manner at the top of the laminate structure, for selectively reflecting and transmitting the light beam in accordance with a phase difference given to the light beam, and wherein the separation layer functions as a beam splitter arranged between the light source and the optical system.

5. An optical pickup which irradiates a light beam emitted by a light source via an optical system onto an information storage medium and receives the light beam reflected therefrom, comprising:

a light guide path element comprising:
  a waveguide layer for propagating the light beam;
  a grating for input-coupling a part of the light beam reflected by the information storage medium with the waveguide layer and for transmitting a remaining part of the light beam; and
  a light receiving portion for receiving light beam transmitted through the grating, wherein the waveguide layer, the grating and the light receiving portion are formed in a laminated manner to form a laminate structure, wherein the grating comprises a first grating pattern adapted to an irradiation state of the light beam when the information storage medium and the optical system move away from each other by a predetermined distance to maximize a coupling efficiency with the waveguide layer, and a second grating pattern adapted to an irradiation state of the light beam when the information storage medium and the optical system approach each other by the predetermined distance to maximize a coupling efficiency with the waveguide layer, wherein the light receiving portion comprises a first light receiving area corresponding to the first grating pattern and a second light receiving area corresponding to the second grating pattern, and wherein a focus error signal is produced based on a difference signal of light receiving signals outputted by the light receiving areas.

6. The optical pickup according to claim 5, wherein an RF signal and a tracking error signal are produced based on the light receiving signals from the light receiving areas.

7. An optical pickup which irradiates a light beam emitted by a light source via an optical system onto an information storage medium and receives the light beam reflected therefrom, comprising:
a light guide path element comprising:
  a grating element for diffracting a part of the light beam reflected by the information storage medium and for transmitting a remaining part of the light beam; and
  a light receiving portion for receiving light beam transmitted through the grating element, wherein the grating element comprises a first grating pattern adapted to an irradiation state of the light beam when the information storage medium and the optical system move away from each other by a predetermined distance to maximize a diffraction efficiency, and a second grating pattern adapted to an irradiation state of the light beam when the information storage medium and the optical system approach each other by the predetermined distance to maximize a diffraction efficiency, wherein the light receiving portion comprises a first light receiving area corresponding to the first grating pattern and a second light receiving area corresponding to the second grating pattern, and wherein a focus error signal is produced based on a difference signal of light receiving signals outputted by the light receiving areas.

8. The optical pickup according to claim 7, wherein an RF signal and a tracking error signal are produced based on the light receiving signals from the light receiving areas.

* * * * *